United States Patent [19]

Takada

[11] 4,053,116
[45] Oct. 11, 1977

[54] RETRACTION LOCKING SAFETY BELT RETRACTOR

[75] Inventor: Juichiro Takada, Tokyo, Japan

[73] Assignee: Takata Kojyo Co., Ltd., Tokyo, Japan

[21] Appl. No.: 688,661

[22] Filed: May 21, 1976

[51] Int. Cl.² .................... A62B 35/00; B65H 75/48
[52] U.S. Cl. ............................................. 242/107.7
[58] Field of Search .............. 242/107.4 R–107.4 E, 242/107.6, 107.7

[56] References Cited

U.S. PATENT DOCUMENTS

| | | | |
|---|---|---|---|
| 3,491,966 | 1/1970 | Curran et al. | 242/107.6 X |
| 3,635,420 | 1/1972 | Romanzi | 242/107.4 D |
| 3,834,646 | 9/1974 | Heath | 242/107.7 |
| 3,851,836 | 12/1974 | Sprecher | 242/107.7 |
| 3,858,826 | 1/1975 | Sprecher | 242/107.7 |
| 3,869,098 | 3/1975 | Sprecher | 242/107.6 X |

*Primary Examiner*—Stanley N. Gilreath
*Assistant Examiner*—John M. Jillions
*Attorney, Agent, or Firm*—Wolder and Gross

[57] ABSTRACT

A safety belt retractor reel which is automatically locked against belt extraction in response to certain conditions or manipulation is provided with a mechanism for releasably locking the reel against belt retraction in response to a predetermined manipulation of the belt. The mechanism includes a ratchet wheel rotatable with the reel and a pawl spring biased into engagement with the ratchet wheel to lock the reel against retraction rotation. The pawl has a locking shoulder and a cam edge. An actuator member is slip drive coupled to the reel and has a radial arm carrying a transversely projecting follower which engages the cam surface to retract the pawl with the reel belt extraction rotation. A locking member is slip drive coupled to the reel and has a radial arm carrying a transversely projecting locking element movable out of and into engagement with the locking shoulder with the extraction and retraction rotation of the reel.

6 Claims, 6 Drawing Figures

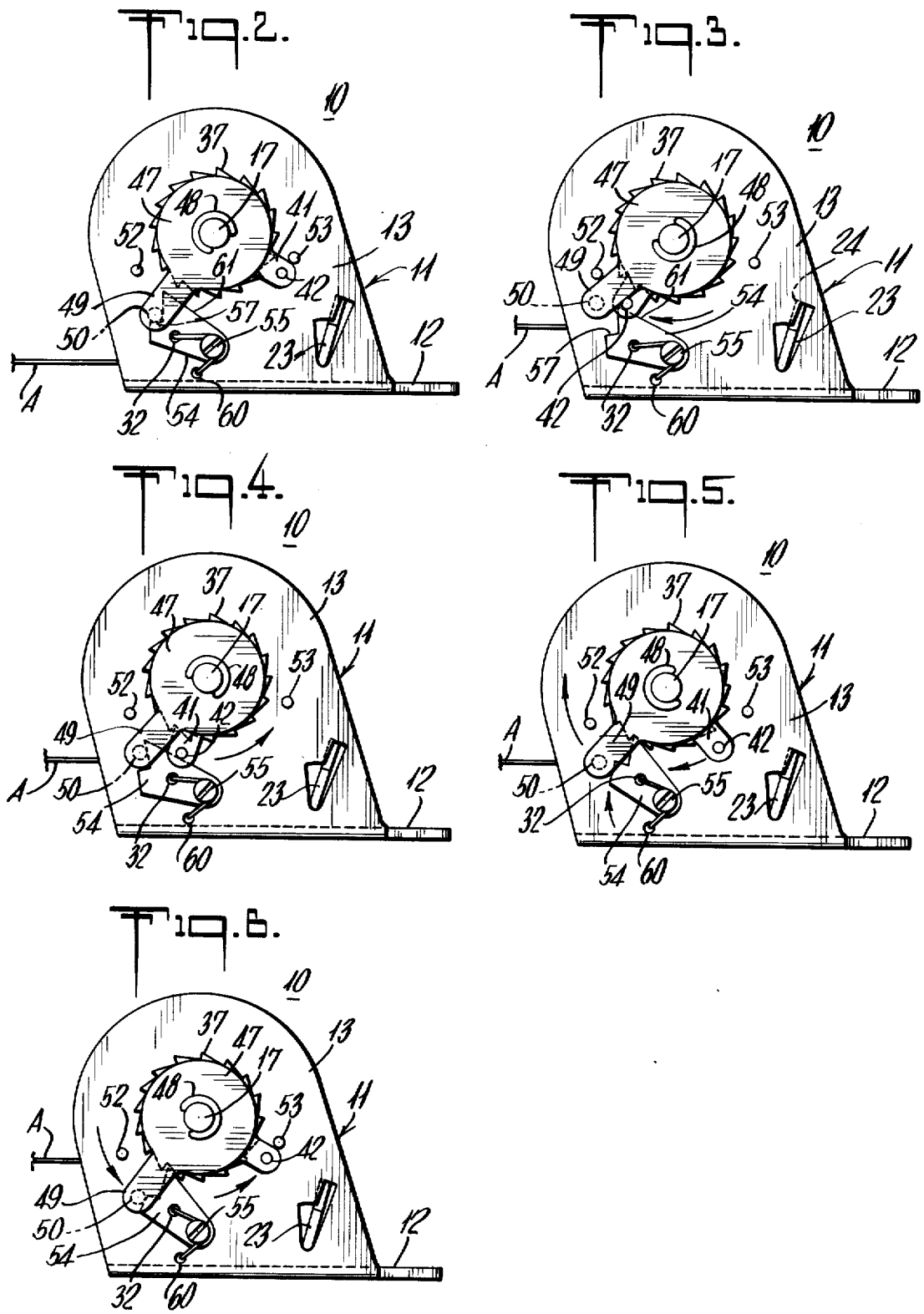

RETRACTION LOCKING SAFETY BELT RETRACTOR

BACKGROUND OF THE INVENTION

The present invention relates generally to improvements in vehicle safety belt retraction reels and it relates more particularly to an improved safety belt retraction reel of the automatic or emergency locking type provided with a mechanism for releasably locking the reel against belt retraction.

As an effective means for minimizing fatalities or injuries to vehicle passengers in the event of accident, safety belts are installed in almost all of the vehicles of recent manufacture, but the percentage of the passengers wearing such safety belt is far from satisfactory. To encourage the motorist and other vehicle passengers to wear the safety belt, various arrangements and devices have been proposed for improving or simplifying the procedures in handling the belt. Among such proposals are a belt retracting winding device, an automatically locking retracting device which obviates any belt length adjustment when wearing the belt, and an emergency locking winding device which permits free movement of the wearer except at the time of an emergency. However, these devices have the defect that a sense of oppression is imparted to the abdomen or shoulder of the belt wearer as the belt winding force is always acting on the wearer, and hence it has been an important object for encouraging the wear of the safety belt to eliminate such sense of oppression from the belt wearer.

SUMMARY OF THE INVENTION

It is accordingly a principal object of the present invention to provide an improved vehicle safety belt retractor device.

Another object of the present invention is to provide an improved safety belt retractor reel in which the belt take-up reel is selectively locked against belt retraction or released.

Still another object of the present invention is to provide in a safety belt retractor reel which is automatically locked against belt extraction in response to emergency conditions or upon withdrawal of a predetermined length of belt an improved belt controlled mechanism for selectively releasing and locking the reel against belt retraction.

A further object of the present invention is to provide a device of the above nature characterized by its simplicity, reliability, ruggedness, low cost, ease of operation and great versatility and adaptability.

The above and other objects of the present invention will become apparent from a reading of the following description taken in conjunction with the accompanying drawings which illustrate preferred embodiments thereof.

In accordance with the present invention there is provided an automatically locking type or emergency locking type safety belt retracting device which is capable of eliminating the sense of oppression imparted to the wearer when wearing the safety belt, by a simple mechanism in which a ratchet wheel is affixed to the reel shaft and a pawl having a lock shoulder and a cam surface is spring biased into engagement with ratchet wheel to lock the reel against belt retraction rotation. An actuator member is rotatable on the shaft and slip drive coupled to the ratchet wheel and has a radial arm carrying a transversely projecting follower which engages the cam surface and retracts the pawl member with extraction rotation of the reel and a locking member is rotatable on the shaft and slip drive coupled to the ratchet wheel and has a radial arm carrying a transversely projecting locking element movable by the carrying arm toward and away from registry with the locking shoulder with the retraction and extraction rotation of the reel. The various elements are so dimensioned and related that a short belt retraction followed by belt release releases the pawl to lock the reel against belt retraction rotation to thereby eliminate the sense of oppression to the belt wearer. A long belt retraction followed by belt release effects the locking of the pawl in its retracted position to release the reel for belt retraction rotation.

The improved device is reliable, rugged, simple, of low cost, easy to operate and highly versatile and adaptable.

BRIEF DESCRIPTION OF THE DRAWINGS

FIG. 2 is a side elevational view of the assembled reel shown in a locked reel released condition;

FIG. 3 is a view similar to FIG. 2 showing the reel in an intermediate transfer condition;

FIG. 4 is a view similar to FIG. 2 showing the reel condition following that shown in FIG. 3 attendant to the locking of the reel brake in a reel release condition;

FIG. 5 is a view similar to FIG. 2 showing the reel in an intermediate transfer condition attendant to the release of the reel brake to a reel braking condition; and FIG. 6 is a view similar to FIG. 2 showing the reel in a braked condition.

DESCRIPTION OF THE PREFERRED EMBODIMENT

Figure 1:
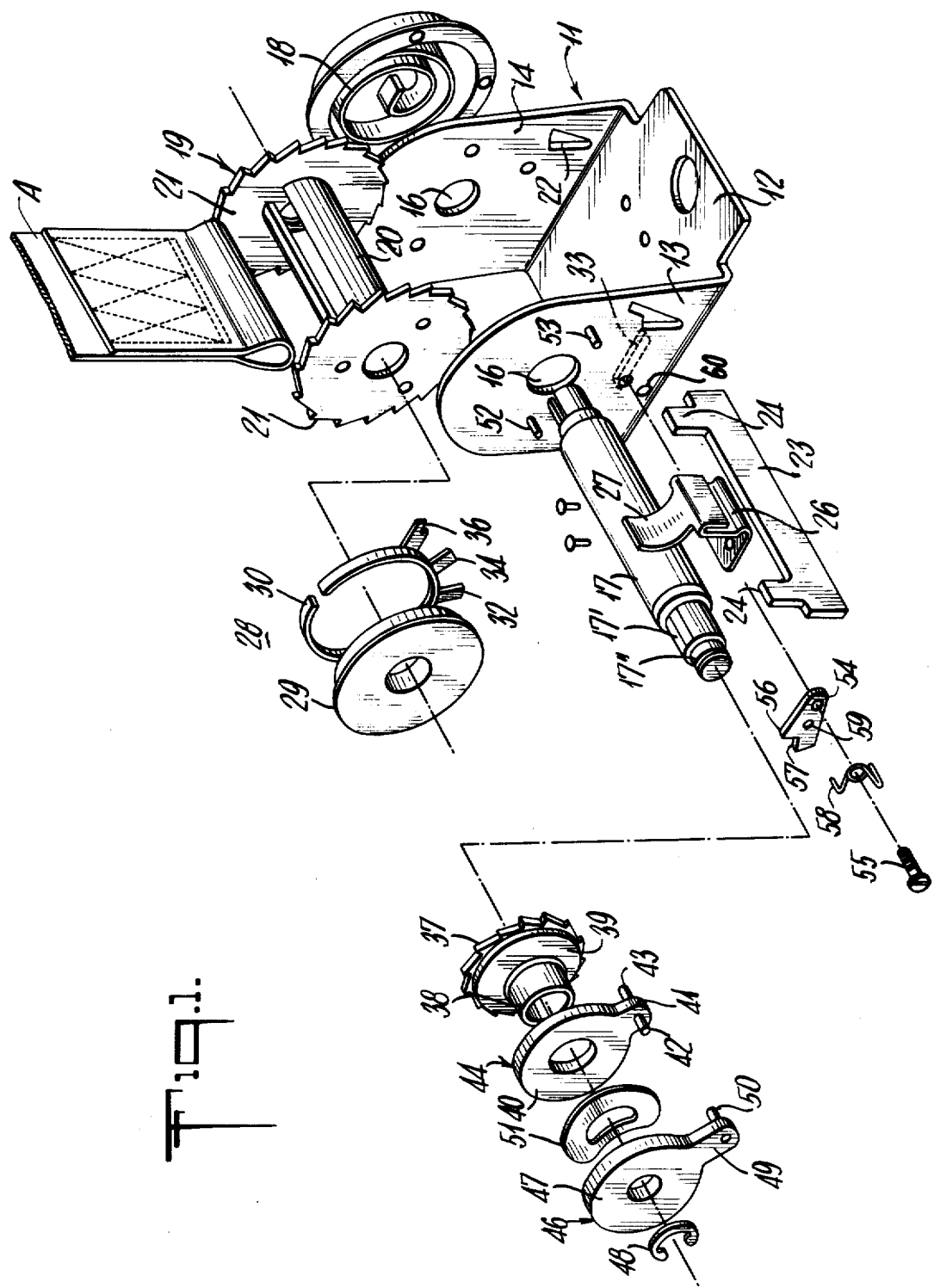
FIG. 1 is an exploded perspective view of a safety belt retractor reel embodying the present invention.

Referring now to the drawings which illustrate a preferred embodiment of the present invention, the reference numeral 10 generally designates the improved safety belt retraction reel which comprises a U-shaped mounting reel 11 including a base web 12 and opposite parallel side webs 13 and 14 having transversely axially aligned bores 16. A shaft 17 extends between and beyond and is journalled in bores 16 and outside side web 13 is provided with successively stepped stub portions 17' and 17". Mounted on the outside face of side web 14 is a suitably housed and anchored spiral rewind spring 18 whose inner end is secured to shaft 17 and which is wound and loaded with the extraction of the associated safety belt A and which biases the shaft 17 to rotate in a belt retraction direction, counterclockwise, as viewed in the drawings.

Affixed to the shaft 17 and rotatable therewith is a belt retraction reel 19 located between side webs 13 and 14 and including a hub 20 and a pair of end belt extraction braking ratchet wheels 21, the belt A being connected to and wound on hub 20 with the retraction rotation of shaft 17 by spring 18. Rockably supported by and between side webs 13 and 14 and swingably engaging enlarged openings 22 therein, is a transversely extending pawl member 23 including pawl elements 24 which are movable into and out of engagement with ratchet wheels 21. A leaf spring 26 is bolted to base web 12 and engages pawl member 23 to resiliently bias pawl elements 24 into locking engagement with ratchet wheels 21 to lock reel 19 against belt extraction. A sensing finger 27 projects from the spring 26 into sensing engagement with the wound belt A on reel 19 to maintain the pawl member away from engagement with ratchet wheels 21 when at least a predetermined amount of belt A is wound on reel 19.

A mechanism 28 for automatically releasably locking the reel 19 against belt extraction independently of the amount of belt wound on the reel includes a peripherally flanged drive drum 29 mounted on shaft 17 between side web 13 and a respective ratchet wheel 21 and bolted to the ratchet wheel to rotate therewith. A split ring clutch band 30 engages the periphery of drum 29 to be friction slip driven thereby and includes a first radial finger 32 slidably engaging a slot 33 in base web 12 to limit the rotation of band 30, a second finger 34 which functions to engage and urge pawl member 23 to a disengage position with the belt retraction rotation of reel 19 and a third finger 36 which is stepped at its end and functions to engage and urge the adjacent pawl element 24 in the ratchet wheel engage position with the belt extraction rotation of reel 19. A detailed description of the structure and operation of the mechanism 28 may be found in copending application serial No. 669,355 filed Mar. 22, 1976. It should be noted that in addition to or in place of the mechanism 28 there may be provided any known mechanism for releasably locking the belt against extraction or for automatically locking the belt against extraction when the associated vehicle exceeds a predetermined positive or negative acceleration or tilt.

In accordance with the present invention there is provided a novel mechanism for selectively braking and releasing the reel for belt retraction rotation in response to predetermined manipulation of the belt A. The retraction braking mechanism comprises a ratchet wheel 37 oriented in a direction opposite to that of ratchet wheels 21 and including an elongated hub 38 affixed to a noncircular stub 17' adjacent the outside face of side web 13 to be rotatable with reel 19.

Rotatably mounted on hub 38 and in face to face frictional engagement with a circular friction plate 39 coaxially affixed to the outside face of ratchet wheel 37 is an annular frictional clutch plate 40 which together with an outwardly radially projecting arm 41 provided at its end with opposite longitudinal projections or pins 41 and 43 defines an actuator member 44. A pawl lock member 46 includes an annular frictional clutch plate 47 rotatable on shaft stub section 17" and retained thereof by a split E-ring 48 engaging a corresponding peripheral groove formed in the end of stub section 17", a radial arm 49 longer than arm 41 projecting outwardly from plate 47 and terminating in a longitudinal projection or pin 50.

Sandwiched between the confronting faces of clutch plates 40 and 47 and engaging stub 17' is an undulate annular leaf spring 51 which bears on the confronting faces of the clutch plates and urges the clutch plate 44 in frictional slipping drive engagement with plate 39. As a consequence, the actuator and locking member 40 and 46 are frictionally slip driven by reel 19 by way of shaft 17, plate 39 and undulate annular leaf spring 51. The arms 41 and 49 are downwardly directed and limited in their angles of rotation, the arm 49 being limited in its clockwise movement by a stop pin 52 located on the outside face of side web 13 in the path of arm 49 and the arm 41 being limited in its counterclockwise rotation by a stop pin 53 located on the outside face of side web 13 in the path of arm 41. The clockwise movement of arm 41 and the counterclockwise movement of arm 49 are restricted by projection 42 lying in the path of arm 49.

Pivoted by pin 55 on the outside face of side web 13 below the ratchet wheel 37 is a pawl member 54 having a pawl section or element 56 which is swingable into and out of engagement with ratchet wheel 37 to respectively lock the ratchet wheel 37 and reel 17 against retraction rotation and release the reel 19 to rotate in a belt retraction direction. An upwardly facing stop shoulder or abutment 57 is formed on pawl member 54 and is movable with the swinging of pawl member 54 across the path of lock projection 50. A hairpin spring 58 engages pivot pin 55 and includes a leg engaging a bore 59 in pawl member 54 and a leg engaging a lower bore 60 in side web 13 to resiliently bias the pawl element 56 into engagement with ratchet wheel 37.

Considering now the operation of the improved reel described above, when the belt A is extracted and applied to a seat occupant the pawl 23 is released by finger 27 to resiliently move toward engagement with ratchet wheel 21 and is permitted to engage the ratchet wheel upon slight release of the belt and retraction rotation of the reel 19 to releasably lock the belt reel against extraction. If automatic vehicle condition responsive reel locking means are provided these operate in the known manner and the mechanism 28 may be omitted.

Assuming the initial position of lock arm 49 and projection 50 and lock shoulder 57 are as shown in FIG. 2 with the projection 50 engaging the shoulder 57, the pawl member 54 is locked in its retracted position out of engagement with ratchet wheel 37 so that reel 19 is spring urged and tends to rotate in a belt retraction direction to so load the belt. In order to lock the reel 19 against belt retraction rotation the belt A is slightly extracted to correspondingly rotate the reel 19 clockwise and friction drive swing the projection 50 out of engagement with shoulder 57 so that the pawl member 54 is swung under the influence of spring 58 into engagement with ratchet wheel 37 as shown in FIG. 5, to lock the reel 19 against rotation in a belt retraction direction. Release of the excess pull on the belt A may permit a slight retraction of reel 17 with the consequent counterclockwise rotation of arm 49 into engagement with the free end of pawl member 54 and arm 41 with pin 53, as seen in FIG. 6. In this position there is no retraction pull on the belt A.

In order to permit the retraction and winding of belt A, if the pawl 54 is in its locked retracted position, as shown in FIG. 2, the belt is merely permitted to be retracted and wound by the released reel 19. If, on the other hand the reel 19 is locked against retraction rotation, as shown in FIG. 6, the belt A is extracted an amount sufficient to friction drive swing arms 41 and 49 to their clockwise most position, as shown in FIG. 3 with the pin 43 advancing and bearing on the upper cam surface 61 of pawl member 54 to advance the pawl member 54 to its retracted position out of engagement with ratchet wheel 37. Thereafter, the belt A is released and retracted and wound by reel 19, the arm swinging counterclockwise to bring pin 50, as shown in FIG. 4, in locking registry with pawl member shoulder 57 which advances into locked retracted engagement with pin 50 with the further counterclockwise movement of arm 43 and disengagement of cam surface 61. Thus, the position of the pawl 54 in its reel locking and release position respectively is effected by extracting the belt A a relatively small amount and then releasing it and extracting the belt a relatively small predetermined amount and then releasing it.

While there has been described and illustrated a preferred embodiment of the present invention, it is apparent that numerous alterations, omissions and additions may be made without departing from the spirit thereof.

I claim:

1. A belt retractor device comprising a reel rotatable in opposite belt retraction and extraction directions, a belt coupled to said reel and windable thereon with the belt retraction rotation thereof, spring means biasing said reel in the belt retraction rotation thereof, a ratchet wheel rotatable with said reel, a pawl member swingable between an advance position engaging said ratchet wheel and locking said reel against retraction rotation and a retracted position disengaging said ratchet wheel and having a lock shoulder and a cam edge, spring means biasing said pawl member toward its advance position, an actuator member rotatable through a restricted angle about the axis of said reel and slip drive coupled thereto, a follower element defining projection projecting transversely from and eccentrically located on said actuator member and movable in engagement with said cam surface to retract said pawl member with the extraction rotation of said reel, a locking member rotatable through a restricted angle about the axis of said reel and drive coupled thereto, a locking element defining projection located eccentrically on and projecting transversely from said locking member and movable into registry with said pawl member shoulder with the retraction rotation of said reel and a release element defining projection eccentrically located on and projecting from said actuator member and movable into engagement with said locking member with the extraction rotation of said reel to retract said locking element from said pawl lock shoulder to permit the spring advance of said pawl into engagement with said ratchet wheel.

2. The belt retractor device of claim 1 comprising a U-shaped bracket including a cross web and side webs, said reel being affixed to said shaft between said side webs, said ratchet wheel being affixed to said shaft adjacent an outside face of one of said side webs, said actuator member including a first annular plate rotatable on said shaft proximate said ratchet wheel and a first radial arm extending from said annular plate and carrying said follower element proximate its end, said locking member including a second annular plate rotatable on said shaft proximate said ratchet wheel and a second radial arm extending from said second annular plate and carrying said locking element.

3. The belt retractor device of claim 2 comprising an undulate annular leaf spring sandwiched between said first and second annular members, one of said annular members being urged by said spring into engagement with a confronting face of said ratchet wheel and the other annular member being limited against axial outward movement on said shaft.

4. The belt retractor device of claim 3 wherein said follower element comprises a first pin projecting transversely from said first arm and said locking element comprises a second pin projecting transversely from said second arm.

5. The belt retractor device of claim 4 wherein said release element includes a third pin projecting transversely from said first arm opposite to said first pin and movable with the swinging of said first arm into engagement with said second arm.

6. The belt retractor device of claim 1 comprising braking means for releasably braking said reel against belt extraction rotation in response to the rotation of said reel to at least a predetermined amount of belt extraction followed by the belt retraction rotation of said reel.

* * * * *